(12) United States Patent
Fulleringer et al.

(10) Patent No.: US 11,060,456 B2
(45) Date of Patent: Jul. 13, 2021

(54) CENTRIFUGAL DEAERATOR FOR A TURBOMACHINE

(71) Applicant: SAFRAN HELICOPTER ENGINES, Bordes (FR)

(72) Inventors: Benjamin Fulleringer, Moissy-Cramayel (FR); Jean-Pierre Pajard, Moissy-Cramayel (FR); Yannick Cazaux, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 194 days.

(21) Appl. No.: 16/493,161

(22) PCT Filed: Mar. 7, 2018

(86) PCT No.: PCT/FR2018/050526
§ 371 (c)(1),
(2) Date: Sep. 11, 2019

(87) PCT Pub. No.: WO2018/172645
PCT Pub. Date: Sep. 27, 2018

(65) Prior Publication Data
US 2020/0072126 A1 Mar. 5, 2020

(30) Foreign Application Priority Data

Mar. 21, 2017 (FR) ...................................... 1752306

(51) Int. Cl.
*F02C 7/06* (2006.01)
*F01D 25/18* (2006.01)
(Continued)

(52) U.S. Cl.
CPC ................ *F02C 7/06* (2013.01); *F01D 25/18* (2013.01); *B01D 45/14* (2013.01); *F01M 13/04* (2013.01);
(Continued)

(58) Field of Classification Search
CPC ... F02C 7/06; F02C 7/32; F01D 25/18; B01D 45/14; F01M 13/04; F01M 2013/0422; F05D 2260/609; Y02T 50/60
See application file for complete search history.

(56) References Cited

U.S. PATENT DOCUMENTS 5,716,423 A 2/1998 Krul et al.
2016/0138444 A1 5/2016 Prunera-Usach et al.

FOREIGN PATENT DOCUMENTS

FR 3 007 463 A1 12/2014

OTHER PUBLICATIONS

Written Opinion of the International Searching Authority dated Jun. 25, 2018, issued in corresponding International Application No. PCT/FR2018/050526, filed Mar. 7, 2018, 6 pages.
(Continued)

*Primary Examiner* — Lucas A Stelling
*Assistant Examiner* — Hafiz Muhammad Aamir
(74) *Attorney, Agent, or Firm* — Christensen O'Connor Johnson Kindness PLLC

(57) ABSTRACT

A centrifugal deaerator for an air/oil mixture of a turbine engine includes: an annular housing arranged around a hollow shaft and having an outer annular wall and an inner annular wall; axial mixture inlets for the inflow of the air/oil mixture into annular housing; a pinion for rotating the annular housing, the pinion including a web that is securely connected to the hollow shaft and to the inner and outer annular walls; radial oil outlets in the outer wall; and oil-free air outlets in the inner wall. The axial mixture inlets and the
(Continued)

Figure 1:
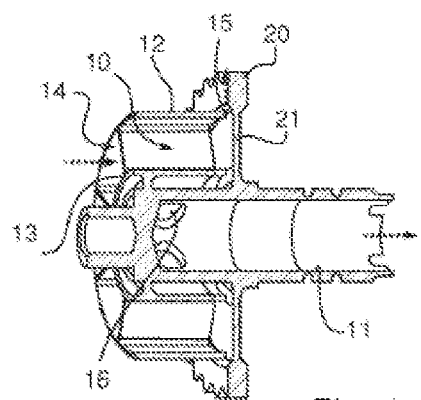

radial oil outlets are axially arranged on either said of the web to prevent the axial mixture inlets from reintroducing oil evacuated by radial oil outlets into the annular housing.

15 Claims, 2 Drawing Sheets

(51) Int. Cl.
    *B01D 45/14*     (2006.01)
    *F01M 13/04*     (2006.01)
    *F02C 7/32*     (2006.01)

(52) U.S. Cl.
    CPC ........ *F01M 2013/0422* (2013.01); *F02C 7/32* (2013.01); *F05D 2260/609* (2013.01)

(56) References Cited

OTHER PUBLICATIONS

International Preliminary Report on Patentability dated Sep. 24, 2019, issued in corresponding International Application No. PCT/FR2018/050526, filed Mar. 7, 2018, 1 page.
International Search Report dated Jun. 25, 2018, issued in corresponding International Application No. PCT/FR2018/050526, filed Mar. 7, 2018, 5 pages.
Written Opinion of the International Searching Authority dated Jun. 25, 2018, issued in corresponding International Application No. PCT/FR2018/050526, filed Mar. 7, 2018, 5 pages.

US 11,060,456 B2

CENTRIFUGAL DEAERATOR FOR A TURBOMACHINE

TECHNICAL FIELD OF THE INVENTION

The invention relates to a centrifugal deaerator for a turbine engine.

TECHNOLOGICAL BACKGROUND

Turbine engines are complex systems which implement a certain number of rotating units (turbines, compressor, etc.) which must be equipped with sealing devices. These sealing devices are generally produced by pressurized air labyrinths arranged in the vicinity of the rotating units. To do this, air is removed directly in the air duct of the turbine engine. This air then travels into the turbine engine by the different labyrinths provided for this purpose, then is evacuated towards the outside of the turbine engine to limit the increase in pressure of the other zones of the turbine engine, in particular the reduction gear, the accessory box, etc. However, this air having travelled through different zones of the turbine engine, is loaded with oil used for the cooling and lubrication of bearings and pinions of the rotating units. To avoid the oil-loaded air discharge, easing the ecological impact of turbine engines, reducing the oil consumption and limiting the filling operations of the oil reserves, it is important to provide deaerators which make it possible to separate oil from air before evacuating air towards the outside of the turbine engine.

Such a deaerator is generally arranged and driven by a mechanical power take-off at the level of the accessory box or the reduction gear of the turbine engine.

In a known manner, such a centrifugal deaerator comprises one or more enclosures for centrifugal separation of the air/oil mixture arranged around a hollow shaft and delimited by an outer annular wall and an inner annular wall. The deaerator further comprises an axial inlet for providing the enclosure with the air/oil mixture, and a peripheral oil outlet arranged in the outer wall. Thus, during the rotation of the deaerator, obtained generally by way of a pinion of the accessory box or of the reduction gear, the oil is naturally driven by centrifugal force towards the oil outlet arranged in the periphery of the deaerator. An oil-free air outlet is furthermore arranged in the inner wall and connected to the hollow shaft, which makes it possible to evacuate air towards the outside.

The inventors have realised that in known deaerators, some of the oil extracted through the peripheral outlet of the deaerator is suctioned again through the axial inlet of the deaerator, which limits the performances of the deaerator. The inventors have also realised that the oil separated from the air by the deaerator forms an oil film which can, in certain cases, be evacuated through the axial air inlet, rather than through the peripheral oil outlet, which contributes to further enriching the air to be de-oiled, and therefore also limits the performances of the deaerator.

The inventors therefore have sought to improve the performance of known deaerators, to further extract oil and limit to the maximum, the quantity of oil discharged towards the outside. In particular, reducing the oil consumption of turbine engines remains a major area of improvement. This must make it possible to optimise the quantity of embedded oil and therefore to reduce the mass of the turbine engine. This must also make it possible to increase the duration of the missions. This must also reduce the maintenance operations on turboshaft engines. Finally, this must make it possible to improve the ecological impact of turboshaft engines.

The prior art also comprises documents FR-A1-3007463 and U.S. Pat. No. 5,716,423.

AIMS OF THE INVENTION

The invention aims to provide a deaerator which overcomes at least some of the disadvantages of known deaerators.

The invention aims in particular to provide, in at least one embodiment, a centrifugal deaerator for a turbine engine which has improved performance with respect to known deaerators.

The invention also aims to provide, in at least one embodiment, a deaerator which limits the risks of reintroduction in the deaerator of the oil evacuated by the latter.

The invention also aims to provide, in at least one embodiment, a deaerator which limits the risks of evacuating an oil film through the air inlet to be de-oiled.

SUMMARY OF THE INVENTION

To do this, the invention relates to a centrifugal deaerator for a turbine engine air/oil mixture comprising:
- an annular enclosure for the centrifugal separation of said mixture arranged around a hollow shaft and delimited by an outer annular wall and an inner annular wall,
- at least one axial inlet of said air/oil mixture in said enclosure,
- a pinion for rotating said enclosure comprising a sail securely connected to said inner and outer annular walls such that a rotation of said pinion drives said enclosure in rotation,
- at least one radial oil outlet arranged in said outer wall and configured to be able to evacuate the oil separated from said mixture towards the outside of the deaerator,
- at least one oil-free air outlet arranged in said inner wall and configured to be able to evacuate the oil-free air towards said hollow shaft.

A centrifugal deaerator according to the invention is characterized in that said axial mixture inlet(s) and said radial oil outlet(s) are arranged axially on either side of said sail of said pinion so as to prevent any reintroduction of oil evacuated by said radial oil outlet(s) in the enclosure through said axial mixture inlet(s).

A deaerator according to the invention therefore makes it possible to segregate the air/oil mixture inlet flows of the oil evacuation flows by cleverly arranging the mixture inlets and the oil outlets with respect to the sail of the pinion for rotating the deaerator. This arrangement provides that the mixture inlets and the oil outlets are axially arranged on either side of the sail of the pinion. This therefore makes it possible to limit, to the maximum, the reintroduction of oil evacuated through the radial oil outlets directly in the mixture present at the inlet of the deaerator. In other words, the sail of the pinion acts as a separation wall between the mixture at the inlet of the deaerator and the oil evacuated through the radial oil outlets. Furthermore, when functioning, the pinion being in rotation, the teeth of the pinion generate, through air mixing, an air wall which surrounds the pinion and which therefore contributes also to limit the passage of the oil evacuated by the radial outlets towards the axial mixture inlets arranged on either side of the pinion. The pinion can be arranged axially at any point between the mixture inlets and the oil outlets. In particular, it can be arranged in the proximity of the mixture inlets or in the proximity of the oil outlets, centred or not.

This specific arrangement of the mixture inlets and of the oil outlets makes it possible to limit the phenomenon of introducing oil into the mixture, which improves the de-oiling performances of the air/oil mixture. This improvement of performances makes it possible to optimise the quantity of oil embedded in the turbine engines and therefore to reduce the mass of the turbine engine. This consequently makes it possible to improve the ecological impact of a turboshaft engine equipped with a deaerator according to the invention.

Advantageously, a deaerator according to the invention comprises at least one anti-return disc extending perpendicularly to the outer wall and partially blocking said axial mixture inlet(s) in the enclosure so as to prevent an oil outlet in the vicinity of said outer wall through said axial mixture inlet(s).

According to this variant, the enclosure comprises an anti-return disc which acts as a wall preventing the oil outlet through the inlet of the mixture. In particular, when functioning, the enclosure is rotated by way of the pinion. The oil is thus driven by the centrifugal acceleration towards the outer wall of the enclosure. In the vicinity of the outer wall, before the evacuation of oil through the radial outlets, the oil forms an oil film which extends over the inside of the outer wall. To avoid this film sliding over the inside of the outer wall and emerging through the axial mixture inlets, the invention according to this variant provides a disc which blocks at the level of the outer wall of the oil passage. This therefore makes it possible to avoid the mixture at the inlet of the enclosure being enriched by the oil extracted from the mixture during the processing by the deaerator.

Advantageously and according to this variant, the anti-return disc is formed by a portion of the sail of the pinion arranged upstream of said enclosure and surrounding the axial mixture inlets.

According to this variant, the sail of the pinion is arranged upstream of said enclosure. Furthermore, it contributes to forming the anti-return disc.

Advantageously and according to this variant, said sail of said pinion comprises access openings to said axial inlet(s) of the mixture in the enclosure. The pinion being arranged upstream of the enclosure, the sail advantageously comprises openings making it possible for the mixture to access the enclosure.

Advantageously and according to the invention, said enclosure is formed of a plurality of compartments arranged radially around the hollow shaft, each compartment being provided with mixture by an axial mixture inlet, and being connected to a radial oil outlet and to an oil-free air outlet.

According to this variant, the enclosure of the deaerator is divided into a plurality of compartments, each compartment being connected to an axial inlet of the mixture to be able to be provided with mixture, a radial oil outlet to be able to evacuate oil outside of the deaerator, and an oil-free air outlet to be able to evacuate oil-free air towards the hollow shaft. These compartments are evenly distributed around the hollow shaft. This makes it possible to improve the de-oiling of the mixture by forming a plurality of centrifugal sub-enclosures for separating the mixture.

Advantageously, in one of the embodiments, a deaerator according to the invention can also comprise a metal foam arranged in said enclosure.

A deaerator equipped with a metal foam, such as a foam commercialised under the name Retimet®, makes it possible to form a potential significant contact surface with the air/oil mixture which makes it possible to improve the probability of capturing an oil particle which is then centrifugated outside of the deaerator. These foams act as a filter. Furthermore, the centrifugal effect makes it possible to avoid the saturation of filters by the continuous evacuation of oil drops attached to the filters.

Advantageously and according to the invention, said metal foam extends partially axially into said enclosure so as to delimit a foam-free space between said axial mixture inlet and said metal foam, said free space favouring the suctioning of the mixture to be separated and said metal foam favouring the capture of the oil particles to be evacuated by the centrifugal enclosure.

According to this advantageous variant, the metal foam does not fully fill the enclosure of the deaerator, but only one portion of the enclosure. A first portion in the vicinity of the axial mixture inlets is left foam-free and a second portion in the vicinity of the bottom of the enclosure, i.e. arranged axially opposite the inlets, is filled with metal foam.

According to this variant, the air/oil mixture enters into the deaerator through the axial inlets and circulates axially in this first portion, without notable load losses. In this first portion, a first de-oiling phase is carried out by the movement of oil drops towards the periphery of the enclosure under the effect of the centrifugal force. The second portion of the enclosure is equipped with metal foams which are driven axially by the oil drops, thus limiting the load losses. The oil drops captured by the foams are then centrifugated towards the periphery of the enclosure.

Advantageously and according to this variant, the metal foam has a variable thickness between the inner wall and the outer wall of the enclosure so as to standardise the load losses between the zones close to the inner wall not highly subjected to the centrifugal force and the zones close to the outer wall highly subjected to the centrifugal force.

Given the architecture of a deaerator according to the invention, the shortest path for air between the inlet and the oil-free outlet is that passing through the foam base, i.e. in the vicinity of the hollow shaft. Air therefore tends to pass through this low portion, which is furthermore, less subjected to the centrifugal force than the portions close to the periphery of the enclosure. To limit this phenomenon, this variant provides a modification of the geometry of the foam between the low portion of the foam (i.e. that in the vicinity of the inner wall) and the upper portion of the foam (i.e. that in the vicinity of the outer wall), which makes it possible to best distribute the air passage and to standardise the load losses. The flow is thus best distributed and the speeds of the mixture are more homogenous. The oil which rises in the metal foams therefore tends to form increasingly larger drops, which increases the oil concentration in the foams in the vicinity of the periphery of the enclosure. The shape of the filter can also facilitate draining of the oil contained in the filter.

According to a variant, the oil-free air outlets have no metal foam.

The invention also relates to a turboshaft engine comprising a mechanical member of the accessory box or reduction gear type, characterised in that it comprises a deaerator according to the invention.

A turboshaft engine according to the invention equipped with a deaerator according to the invention therefore consumes less oil than a prior art turboshaft engine by an improved oil recovery. A turboshaft engine according to the invention is lighter than a prior art turboshaft engine. The duration of a mission of a helicopter equipped with turboshaft engines according to the invention is therefore longer. Furthermore, the maintenance operations are less frequent. Finally, the ecological impact of a turboshaft engine according to the invention is better than that of turboshaft engines of the prior art.

The invention also relates to a deaerator and a turboshaft engine characterised in combination by all or some of the features mentioned above or below.

LIST OF FIGURES

Figure 2:
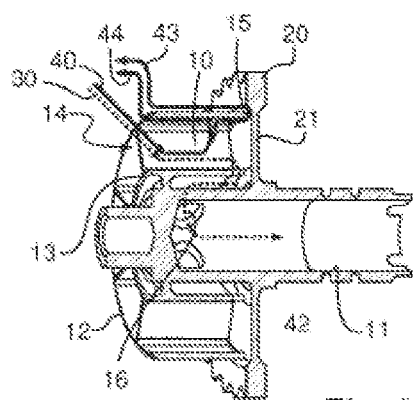
Figure 3:
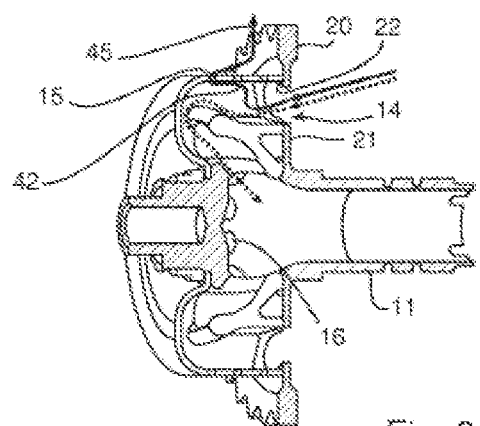
Figure 4:
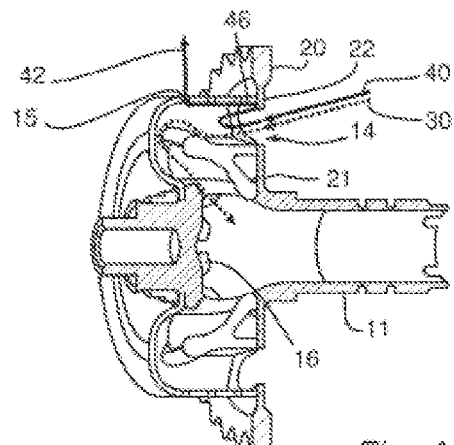
Figure 5:
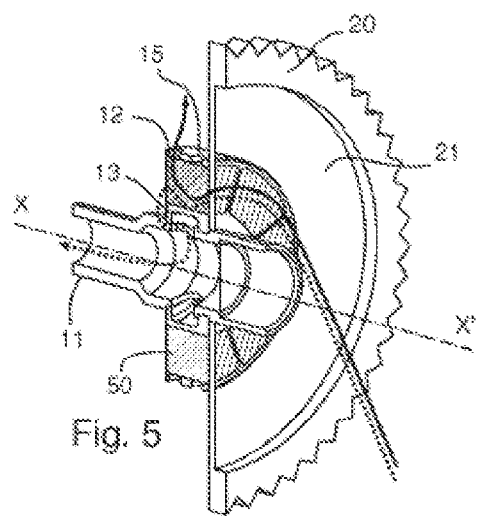
Figure 6:
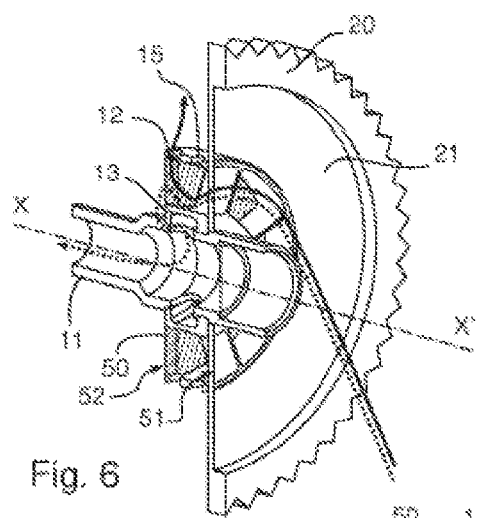
Figure 7:
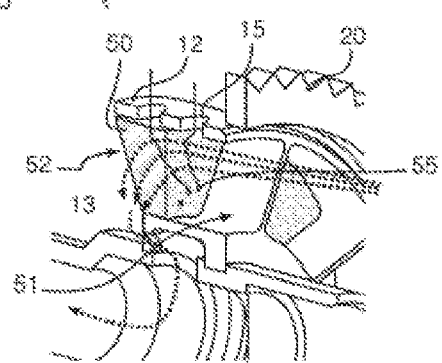

Other aims, features and advantages of the invention will appear upon reading the following description given only in a non-limiting manner and which refers to the appended figures, wherein:

FIG. 1 is a schematic, perspective and cross-sectional view along a symmetrical plane of a deaerator of the prior art highlighting the general functioning principle of the deaerator, FIG. 2 is a schematic, perspective and cross-sectional view along a symmetrical plane of a deaerator of the prior art highlighting the problems encountered with this type of deaerator, FIG. 3 is a partial, schematic, perspective and cross-sectional view along a symmetrical plane of a deaerator according to an embodiment of the invention highlighting a first advantage brought by this deaerator, FIG. 4 is a partial, schematic, perspective and cross-sectional view along a symmetrical plane of the deaerator of FIG. 3 highlighting a second advantage brought by this deaerator, FIG. 5 is a schematic, perspective and cross-sectional view along a symmetrical plane of a deaerator according to another embodiment of the invention, FIG. 6 is a schematic, perspective and cross-sectional view along a symmetrical plane of a deaerator according to another embodiment of the invention, FIG. 7 is a partial, schematic, perspective and cross-sectional view along a symmetrical plane of a deaerator according to another embodiment and highlighting the movement of oil drops in a metal foam.

DETAILED DESCRIPTION OF AN EMBODIMENT OF THE INVENTION

In the figures, the scales and proportions are not strictly adhered to and this, for purposes of illustration and clarity.

In all the figures and from one embodiment to another, the same number references are used for identical elements, or elements of the same nature.

FIG. 1 illustrates the architecture of a known deaerator. Such a deaerator conventionally comprises an annular enclosure 10 for the centrifugal separation of an air/oil mixture around a hollow shaft 11. This annular enclosure 10 is delimited by an outer annular wall 12 and an inner annular wall 13. This enclosure 10 comprises a plurality of deaerating compartments distributed around the hollow shaft 11.

The deaerator further comprises a plurality of axial inlets 14 making it possible for the air/oil mixture to enter into the enclosure 10. Generally, and such as represented in the figures, each compartment of the enclosure 10 is connected to an axial inlet 14 such that each compartment can receive a mixture to be separated by a dedicated inlet.

The deaerator further comprises a plurality of radial oil outlets 15 arranged in the outer wall 12 and configured to be able to evacuate the oil separated from the mixture by the effect of the centrifugal force of the deaerator. Generally, and such as represented in the figures, each compartment of the enclosure 10 is connected to one or more radial oil outlet(s) 15.

The deaerator further comprises a plurality of oil-free air outlets 16 arranged in the inner wall 13 and configured to be able to evacuate the oil-free air towards the hollow shaft 11. Generally, and such as represented in the figures, each compartment of the enclosure 10 is connected to at least one oil-free air outlet 16.

Finally, the deaerator comprises a pinion 20 for rotating the enclosure 10 comprising a sail 21 securely connected to the hollow shaft 11 and to the inner 13 and outer 12 annular walls.

FIG. 2 illustrates two technical problems encountered with a deaerator of the prior art such as illustrated by FIG. 1. In all the figures, the continuous arrows represent the circulation of the oil and the dotted arrows represent the circulation of the air. At the deaerator inlet, a mixture of air and oil enters into the enclosure 10 of the deaerator. The air from the mixture is represented by the dotted arrow 30 and the oil from the mixture is represented by the continuous arrow 40. Under the effect of the centrifugal force, the oil is evacuated through the peripheral oil outlets 15. This evacuation is represented by the continuous arrow 42. A first technical problem of a known deaerator resides in the fact that some of the oil evacuated by the peripheral oil outlets 15 is reintroduced towards the inlet of the deaerator. This phenomenon is represented by the continuous arrow 43. A second technical problem of a known deaerator resides in the face that some of the oil introduced in the enclosure 10 is repelled directly towards the inlet, even before being evacuated by the oil outlets. This phenomenon is represented by the continuous arrow 44. The oil-free air is itself evacuated towards the hollow shaft. This evacuation is represented by the dotted arrow 31.

Thus, some of the oil from the air/oil mixture to be separated is reintroduced into the mixture with the deaerators of the prior art, either directly even before evacuation of the oil through the peripheral oil outlets, or after evacuation of the oil, by reintroduction of the oil into the mixture.

FIGS. 3 and 4 illustrate a deaerator according to an embodiment of the invention. This deaerator makes it possible to solve the problems encountered with the deaerators of the prior art.

The same references are used for the elements common to the deaerator according to this embodiment of the invention and to the deaerator of the prior art such as described in line with FIGS. 1 and 2.

A deaerator according to the invention comprises, such as represented in FIGS. 3 and 4, axial mixture inlets 14 and radial oil outlets 16 axially arranged on either side of the sail 21 of the pinion 20.

This specific arrangement of the inlets 14 and of the outlets 16 with respect to the sail 21 of the pinion 20 makes it possible to prevent any reintroduction in the enclosure of oil evacuated through the radial outlets. In particular, and such as represented by the continuous arrows 45, the oil evacuated through the outlets 15, formed by orifices in the outer wall 12, cannot be directed towards the inlets 14 because the pinion 20 acts as a separation wall. Furthermore, the rotation of the pinion generates an air wall which prevents the oil circulation towards the inlets 14. Indeed, the teeth of the pinion 20 mix air during the rotation of the pinion, which has the effect of forming an air wall which prevents oil passage towards the axial inlets 14.

Furthermore, according to an advantageous embodiment, the deaerator comprises an anti-return disc 22 which extends perpendicularly to the outer wall 12 and which partially blocks the axial inlets 14 so as to prevent an oil outlet in the vicinity of the outer wall 12 through the axial inlets 15.

In particular, and such as represented by the continuous arrows 46, the oil in the vicinity of the outer wall cannot emerge from the enclosure by the inlets 14 because it is blocked by the disc 22 which extends to the vicinity of the outer wall.

This disc is produced by an excrescence of the sail 21 of the pinion 22 at the level of the inlets 14.

A deaerator according to the invention therefore overcomes the technical problems, encountered with a deaerator of the prior art.

According to an advantageous embodiment and such as represented in FIG. 5, the deaerator further comprises metal foams 50 arranged in each compartment of the enclosure 10. According to the embodiment of FIG. 5, the foams occupy the entire compartment. These foams are, for example, foams commercialised under the brand Retimet®. They make it possible to improve the effectiveness of the deaerator by increasing the probability of capturing oil particles.

According to an advantageous embodiment and such as represented in FIGS. 6 and 7, the metal foams 50 do not fully extend in the compartments, but only extend over an axial portion of each compartment so as to form two separate successive spaces in the compartment: a foam-free space 51 and a foam-lined space 52. The foam-free space 51 is supplied with mixture through the axial inlets 14 and it opens into the foam-lined space 52. The foam-lined space 52 opens into the peripheral oil outlets. The foam-free space 51 thus has a simple centrifugal function of the deaerator making it possible for the oil/air mixture to enter into the enclosure 10 of the deaerator, then to axially move in a rotating marker. During this movement, a first de-oiling phase is carried out. The foam-lined space 52 has a function for capturing oil drops not extracted during the first phase. This second de-oiling phase is furthermore carried out in the foam-lined space 52 without notable load losses due to the axial attack of the oil drops. In addition, the separation of the enclosure between a foam-free space and a foam-lined space makes it possible to avoid the saturation of metal foams of the foam-lined space by a first de-oiling phase in the foam-free space. The inventors have realised that this architecture makes it possible to provide results which combine low load losses of the deaerators, totally foam-free, and the good separation of deaerators, totally foam-lined. In other words, the two spaces cooperate to provide a result which goes beyond the sum of the results of each of the two spaces taken individually.

According to an advantageous embodiment and such as represented schematically in FIG. 7, the metal foams have, in each compartment, a variable thickness between the inner wall 13 and the outer wall 12, which makes it possible to standardise the load losses between the zones close to the inner wall 13 which are not highly subjected to the centrifugal force and the zones close to the outer wall 12 highly subjected to the centrifugal force.

FIG. 7 furthermore schematically illustrates the movement of oil drops 55 in a metal foam. The oil drops 55 are captured by the foam 50 and move towards the periphery of the deaerator due to the centrifugal force resulting from the rotating of the enclosure by way of the pinion 20. However, the oil-free air is naturally evacuated towards the hollow shaft 11 of the deaerator. The movement of the air is schematically represented by the dotted arrows.

The invention is not limited to only the embodiments described in line with the figures. For example, the distribution of radial oil outlets over the periphery of the deaerator can be carried out differently without questioning the principle of the invention, which is to arrange the axial mixture inlets and the radial oil outlets, axially on either side of the pinion driven in rotation of the deaerator. Furthermore, according to other embodiments which are not represented, the metal foams can have other geometries inside the compartments of the enclosure.

The invention claimed is:

1. A centrifugal deaerator for an air/oil mixture of a turbine engine, comprising:
    an annular enclosure for a centrifugal separation of said air/oil mixture arranged around a hollow shaft and delimited by an outer annular wall and an inner annular wall;
    at least one axial mixture inlet for said air/oil mixture in said annular enclosure;
    a pinion configured to rotate said annular enclosure, the pinion comprising a sail securely connected to said hollow shaft and to said inner annular wall and said outer annular wall such that rotation of said pinion drives said annular enclosure in rotation;
    at least one radial oil outlet arranged in said outer annular wall and configured to evacuate an oil portion separated from said air/oil mixture towards an outside of the centrifugal deaerator; and
    at least one oil-free air outlet arranged in said inner annular wall and configured to evacuate an oil-free air portion of said air/oil mixture towards said hollow shaft;
    wherein said at least one axial mixture inlet and said at least one radial oil outlet are axially arranged on either side of said sail of said pinion so as to prevent reintroduction of the oil portion evacuated by said at least one radial oil outlet in the annular enclosure by said at least one axial mixture inlet.

2. The centrifugal deaerator according to claim 1, further comprising at least one anti-return disc extending perpendicularly to the outer annular wall and partially blocking said axial mixture inlet in the annular enclosure so as to prevent an oil outlet in a vicinity of said outer annular wall by said at least one axial mixture inlet.

3. The centrifugal deaerator according to claim 2, wherein the at least one anti-return disc is formed by a portion of the sail of the pinion arranged upstream of said annular enclosure and surrounding the at least one axial mixture inlet.

4. The centrifugal deaerator according to claim 3, wherein said sail of said pinion comprises a plurality of access openings to said at least one axial mixture inlet in the annular enclosure.

5. The centrifugal deaerator according to claim 1, wherein said annular enclosure comprises a plurality of compartments arranged radially around the hollow shaft, each compartment of the plurality of compartments being configured to receive the air/oil mixture through the at least one axial mixture inlet and being connected to the at least one radial oil outlet and to the at least one oil-free air outlet.

6. The centrifugal deaerator according to claim 1, further comprising a metal foam arranged in said annular enclosure.

7. A turboshaft engine comprising a mechanical member, the turboshaft engine comprising the centrifugal deaerator according to claim 1, wherein the centrifugal deaerator is adapted to be driven in rotation by said mechanical member, wherein said mechanical member is configured to be driven by an accessory box or a reduction gear of the turboshaft engine.

8. The centrifugal deaerator according to claim 3, wherein said annular enclosure comprises a plurality of compartments arranged radially around the hollow shaft, each compartment of the plurality of compartments being configured to receive the air/oil mixture through the at least one axial mixture inlet and being connected to the at least one radial oil outlet and to the at least one oil-free air outlet.

9. The centrifugal deaerator according to claim 4, wherein said annular enclosure comprises a plurality of compartments arranged radially around the hollow shaft, each compartment of the plurality of compartments being configured to receive the air/oil mixture through the at least one axial mixture inlet and being connected to the at least one radial oil outlet and to the at least one oil-free air outlet.

10. The centrifugal deaerator according to claim 2, further comprising a metal foam arranged in said annular enclosure.

11. The centrifugal deaerator according to claim 3, further comprising a metal foam arranged in said annular enclosure.

12. The centrifugal deaerator according to claim 4, further comprising a metal foam arranged in said annular enclosure.

13. The centrifugal deaerator according to claim 5, further comprising a metal foam arranged in said annular enclosure.

14. A centrifugal deaerator, comprising:
an annular enclosure arranged around a hollow shaft, the annular enclosure being delimited by an outer annular wall and an inner annular wall;
an axial mixture inlet for an air/oil mixture in the annular enclosure;
a pinion configured to rotate the annular enclosure, the pinion comprising a sail securely connected to the hollow shaft, to the inner annular wall, and to the outer annular wall such that rotation of the pinion drives the annular enclosure in rotation;
a radial oil outlet arranged in the outer annular wall and configured to evacuate an oil portion separated from the air/oil mixture towards an outside of the centrifugal deaerator; and
an oil-free air outlet arranged in the inner annular wall and configured to evacuate an air portion of the air/oil mixture towards the hollow shaft;
wherein the axial mixture inlet and the radial oil outlet are configured to prevent reintroduction of the oil portion of the air/oil mixture evacuated by the radial oil outlet via the axial mixture inlet, by arrangement of the axial mixture inlet on a first side of the pinion and arrangement of the radial oil outlet on a second side of the pinion.

15. A turboshaft engine, comprising:
a mechanical member configured to be driven by an accessory box or a reduction gear of the turboshaft engine; and
a centrifugal deaerator configured to be driven by the mechanical member, the centrifugal deaerator comprising:
an annular enclosure arranged around a hollow shaft, the annular enclosure being delimited by an outer annular wall and an inner annular wall;
an axial mixture inlet for an air/oil mixture in the annular enclosure;
a pinion configured to rotate the annular enclosure, the pinion comprising a sail securely connected to the hollow shaft, to the inner annular wall, and to the outer annular wall such that rotation of the pinion drives the annular enclosure in rotation;
a radial oil outlet arranged in the outer annular wall and configured to evacuate an oil portion separated from the air/oil mixture towards an outside of the centrifugal deaerator; and
an oil-free air outlet arranged in the inner annular wall and configured to evacuate an air portion of the air/oil mixture towards the hollow shaft;
wherein the axial mixture inlet and the radial oil outlet are configured to prevent reintroduction of the oil portion of the air/oil mixture evacuated by the radial oil outlet via the axial mixture inlet, by arrangement of the axial mixture inlet on a first side of the pinion and arrangement of the radial oil outlet on a second side of the pinion.

\* \* \* \* \*